United States Patent
Oitaira et al.

(10) Patent No.: US 8,914,831 B2
(45) Date of Patent: Dec. 16, 2014

(54) COMMUNICATION CONTROLLER AND COMMUNICATION CONTROL METHOD

(71) Applicants: Hitoshi Oitaira, Ome (JP); Tomohiro Kanda, Saitama (JP)

(72) Inventors: Hitoshi Oitaira, Ome (JP); Tomohiro Kanda, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/681,238

(22) Filed: Nov. 19, 2012

(65) Prior Publication Data
US 2013/0283323 A1 Oct. 24, 2013

(30) Foreign Application Priority Data
Apr. 20, 2012 (JP) ................................. 2012-097092

(51) Int. Cl.
| | | |
|---|---|---|
| H04N 7/18 | (2006.01) | |
| H04N 7/173 | (2011.01) | |
| G06F 15/16 | (2006.01) | |
| H04N 21/647 | (2011.01) | |
| H04L 12/18 | (2006.01) | |

(52) U.S. Cl.
CPC .......... *H04N 21/647* (2013.01); *H04L 12/1881* (2013.01)
USPC ................. 725/74; 725/86; 725/98; 725/118; 709/231

(58) Field of Classification Search
USPC ............ 725/74, 86, 93, 96, 98, 118; 709/203, 709/231
See application file for complete search history.

(56) References Cited

U.S. PATENT DOCUMENTS

| | | | |
|---|---|---|---|
| 6,973,081 B1 | 12/2005 | Patel | |
| 7,472,197 B2 * | 12/2008 | Li et al. | ........................... 725/97 |
| 7,519,369 B2 | 4/2009 | Yahagi | |
| 7,630,720 B2 | 12/2009 | Yahagi | |
| 7,962,644 B1 * | 6/2011 | Ezerzer et al. | ................ 709/238 |
| 8,005,065 B2 | 8/2011 | Jia et al. | |
| 2002/0063932 A1 * | 5/2002 | Unitt et al. | .................... 359/168 |
| 2003/0079022 A1 | 4/2003 | Toporek et al. | |
| 2006/0116152 A1 | 6/2006 | Yahagi | |
| 2007/0101012 A1 * | 5/2007 | Li et al. | ........................ 709/231 |

(Continued)

FOREIGN PATENT DOCUMENTS

| | | |
|---|---|---|
| EP | 1993289 | 11/2008 |
| JP | 2004221701 | 8/2004 |

(Continued)

OTHER PUBLICATIONS

European Application No./Patent No. 12187687.4; Extended European Search Report; Mailed May 9, 2013.

(Continued)

*Primary Examiner* — Randy Flynn
(74) *Attorney, Agent, or Firm* — Blakely, Sokoloff, Taylor & Zafman LLP

(57) ABSTRACT

According to one embodiment, a communication controller includes: an output module; a transmitter; and a receiver. The output module is configured to control output of image information to a display. The transmitter is configured to transmit the image information to a first communication device by unicast. The receiver configured to receive a transmission request of the image information from a second communication device. If the receiver receives the transmission request from the second communication device, the transmitter stops transmission of the image information to the first communication device by unicast, and transmits the image information to the first communication device and the second communication device by multicast.

10 Claims, 13 Drawing Sheets

(56) References Cited

U.S. PATENT DOCUMENTS

| | | |
|---|---|---|
| 2007/0291661 A1 | 12/2007 | Nishibayashi et al. |
| 2008/0129879 A1* | 6/2008 | Shao et al. .................. 348/723 |
| 2009/0036140 A1 | 2/2009 | Yahagi |
| 2009/0067407 A1 | 3/2009 | Jia et al. |
| 2009/0136216 A1 | 5/2009 | Kelley et al. |
| 2009/0165044 A1* | 6/2009 | Collet et al. .................. 725/38 |
| 2009/0300185 A1 | 12/2009 | Letellier et al. |
| 2010/0017463 A1* | 1/2010 | Horn et al. .................. 709/203 |
| 2010/0281105 A1* | 11/2010 | Sebastian .................. 709/203 |
| 2010/0322196 A1 | 12/2010 | Cherian et al. |
| 2011/0228769 A1* | 9/2011 | Haimi-Cohen et al. ...... 725/114 |
| 2012/0023535 A1* | 1/2012 | Brooks .................. 725/110 |
| 2012/0263089 A1* | 10/2012 | Gupta et al. .................. 370/312 |
| 2013/0067523 A1* | 3/2013 | Kamitakahara et al. ........ 725/96 |

FOREIGN PATENT DOCUMENTS

| | | |
|---|---|---|
| JP | 2006-094270 | 4/2006 |
| JP | 2007336379 | 12/2007 |
| JP | 2008-102786 | 5/2008 |
| JP | 2010-0166612 | 7/2010 |
| JP | WO 2010118157 | 10/2010 |
| JP | 2010539800 | 12/2010 |
| WO | WO 2007051761 | 5/2007 |

OTHER PUBLICATIONS

Japanese Patent Application No. 2012-097092, Notice of Rejection, mailed Jan. 22, 2013, (with English Translation).
European Application No./Patent No. 12187687.4; Extended European Search Report; Mailed Sep. 5, 2013.

* cited by examiner

COMMUNICATION CONTROLLER AND COMMUNICATION CONTROL METHOD

CROSS-REFERENCE TO RELATED APPLICATIONS

This application is based upon and claims the benefit of priority from Japanese Patent Application No. 2012-097092, filed on Apr. 20, 2012, the entire contents of which are incorporated herein by reference.

FIELD

Embodiments described herein relate generally to a communication controller and a communication control method.

BACKGROUND

Conventionally, there is known a technique for transmitting video data displayed by an arbitrary communication device to another communication device by wired or wireless connection, and for displaying the video data received by the other communication device.

In a conventionally-used screen-data-transferring technique, a communication device at a transmitter side and a communication device at a receiver side are connected to each other on one-to-one basis, and the communication device at the transmitter side transmits video data by unicast. Therefore, the case in which a plurality of communication devices are connected at the receiver side has not been considered. In such case, if video data is transmitted to the plurality of communication devices, the video data is transmitted to each one of the communication devices by unicast, thereby increasing processing load.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a communication controller comprises: an output module; a transmitter; and a receiver. The output module is configured to control output of image information to a display. The transmitter is configured to transmit the image information to a first communication device by unicast. The receiver is configured to receive a transmission request of the image information from a second communication device. If the receiver receives the transmission request from the second communication device, the transmitter stops transmission of the image information to the first communication device by unicast, and transmits the image information to the first communication device and the second communication device by multicast.

Figure 1:
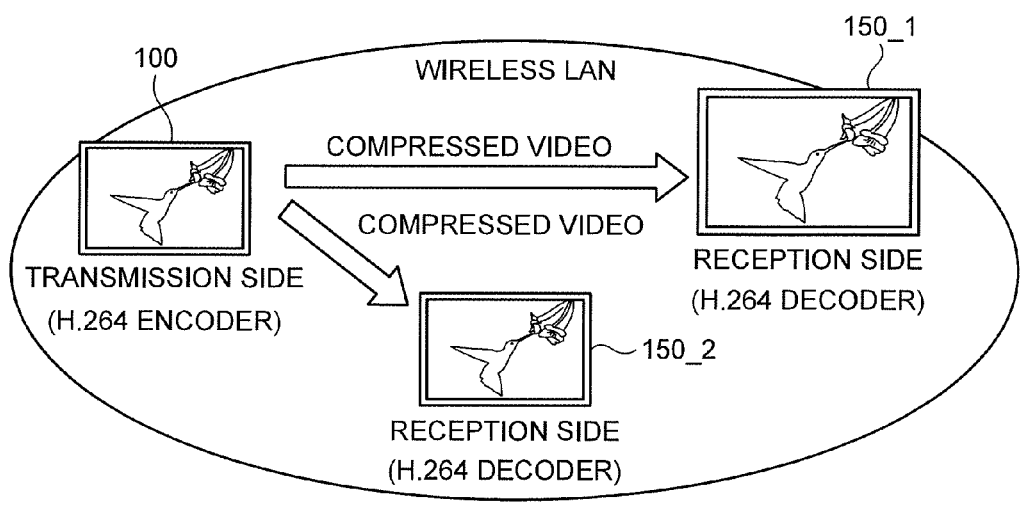
FIG. 1 is an exemplary diagram illustrating an outline of wireless LAN screen transfer according to a first embodiment.

FIG. 1 is a diagram illustrating an outline of wireless LAN screen transfer according to the first embodiment. In an example as illustrated in FIG. 1, a first communication device 100 at a transmission side, and a second communication device 150_1 and a third communication device 150_2 at reception sides are provided. In screen transfer using a wireless LAN according to the first embodiment, video data displayed by the first communication device 100 is encoded and transmitted to one or both of the second communication device 150_1 and the third communication device 150_2. Then, one or both of the second communication device 150_1 and the third communication device 150_2 decode(s) the received video data, and thereafter display(s) it on a display.

In the first embodiment, when wireless communication is performed between the first communication device 100 and the second communication device 150_1 and the third communication device 150_2 at the reception sides, they are connected to each other based on IEEE802.11n of a wireless LAN standard. At the time of the connection, the first communication device 100 and the second communication device 150_1 and the third communication device 150_2 are connected to each other directly without relaying an access point (AP) so as to perform communication. As a wireless communication system in which they are connected to each other on one-to-one or one-to-n with no access point, Wi-Fi Direct is used in the first embodiment. Since the Wi-Fi Direct is a wireless communication system standardized by Wi-Fi Alliance, description thereof is omitted. An example using the Wi-Fi Direct is described in the first embodiment. However, it is sufficient that a wireless communication system that makes it possible to synchronize a screen to be displayed without relaying an access point is used.

In the first embodiment, tablet-type communication terminals are used as the first communication device 100, the second communication device 150_1, and the third communication device 150_2.

It is to be noted that the first communication device 100, the second communication device 150_1, and the third communication device 150_2 are not limited to the tablet-type communication terminals. For example, mobile communication terminals such as a smartphone, portable personal computers (PCs), and the like can be used as the communication devices.

Next, a configuration of the first communication device 100 is described. It is to be noted that the second communication device 150_1 and the third communication device 150_2 have the same configurations as that of the first communication device 100.

Figure 2:
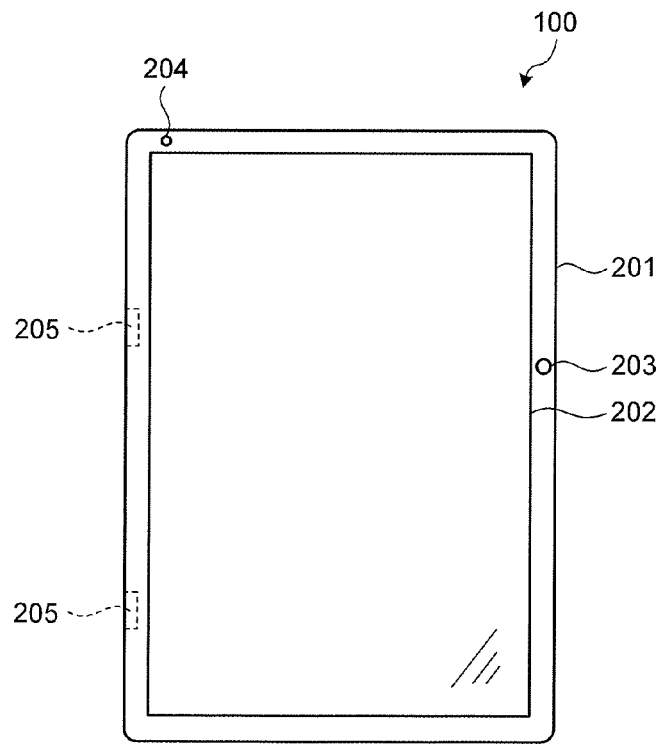
FIG. 2 is an exemplary plan view of an external appearance of a communication device in the first embodiment.

FIG. 2 is a plan view illustrating an example of an external appearance of the first communication device 100. The first communication device 100 comprises a box-shaped thin housing 201 that is gripped by a user. The first communication device 100 comprises a display 202 that displays information at a front surface (one main surface) side of the housing 201. The display 202 comprises a touch panel for detecting a position on a display screen that has been touched by a user.

Furthermore, the first communication device 100 comprises a speaker 205 for outputting sound at a side surface side of the housing 201. In addition, the first communication device 100 comprises a camera module 203 for shooting an image.

Moreover, the first communication device 100 comprises a microphone 204 as a sound collecting module for collecting sounds at the front surface side of the housing 201 and at an upper side of the display 202.

Figure 3:
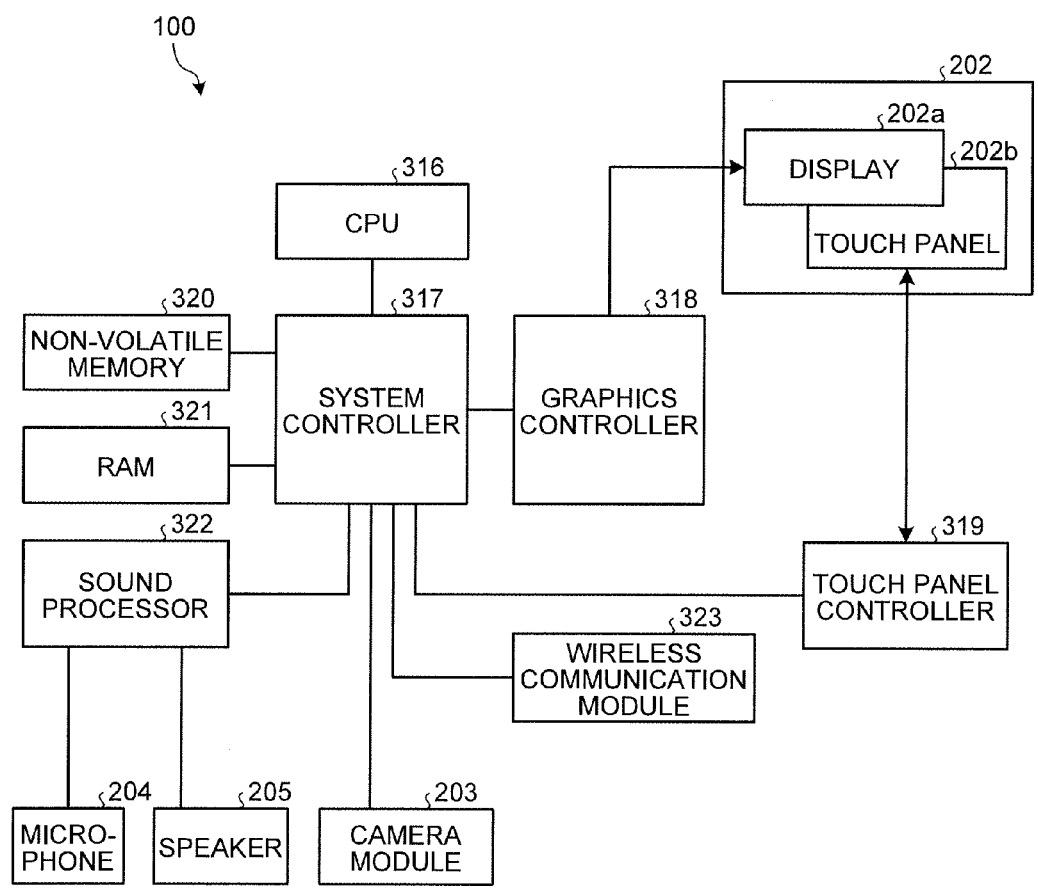
FIG. 3 is an exemplary block diagram of a hardware configuration of the communication device in the first embodiment.

FIG. 3 is a block diagram illustrating an example of a hardware configuration of the first communication device 100. As illustrated in FIG. 3, in addition to the above-described configuration, the first communication device 100 comprises a central processing unit (CPU) 316, a system controller 317, a graphics controller 318, a touch panel controller 319, a non-volatile memory 320, a random access memory (RAM) 321, a sound processor 322, and a wireless communication module 323.

The display 202 is configured as a so-called touch screen in which a display 202a and a touch panel 202b are combined. The display 202a is a liquid crystal display (LCD) or an electro luminescence (EL) display, for example. The touch panel 202b detects a position (a touch position) on a display screen of the display 202a that has been touched with a finger of a user or a stylus pen.

The CPU 316 is a processor that controls operations of the first communication device 100 overall. The CPU 316 controls each part of the first communication device 100 through the system controller 317. The non-volatile memory 320 stores therein an operation system, various application programs, various pieces of data that are necessary for executing the programs, and the like. The RAM 321 provides an operation area when the CPU 316 executes the programs as a main memory of the first communication device 100.

The CPU 316 executes the operation system and various application programs loaded on the RAM 321 from the non-volatile memory 320 so as to realize the function for controlling each part of the first communication device 100, for example.

The system controller 317 incorporates a memory controller that controls accesses to the non-volatile memory 320 and the RAM 321. Furthermore, the system controller 317 has a function of executing communication with the graphics controller 318, the touch panel controller 319, and the sound processor 322. In addition, the system controller 317 has a function of inputting image information from the camera module 203. Furthermore, the system controller 317 has a function of acquiring various pieces of information from the outside of the first communication device 100 using the wireless communication module 323.

The graphics controller 318 is a display controller that controls the display 202a of the display 202. The touch panel controller 319 controls the touch panel 202b so as to acquire coordinate data indicating a position touched by a user from the touch panel 202b.

The sound processor 322 performs processing of outputting sound guidance or the like generated by sound processing such as sound synthesis from the speaker 205 and performs processing on sounds collected by the microphone 204 under control by the CPU 316.

The wireless communication module 323 executes wireless communication with another communication device under control by the CPU 316.

Figure 4:
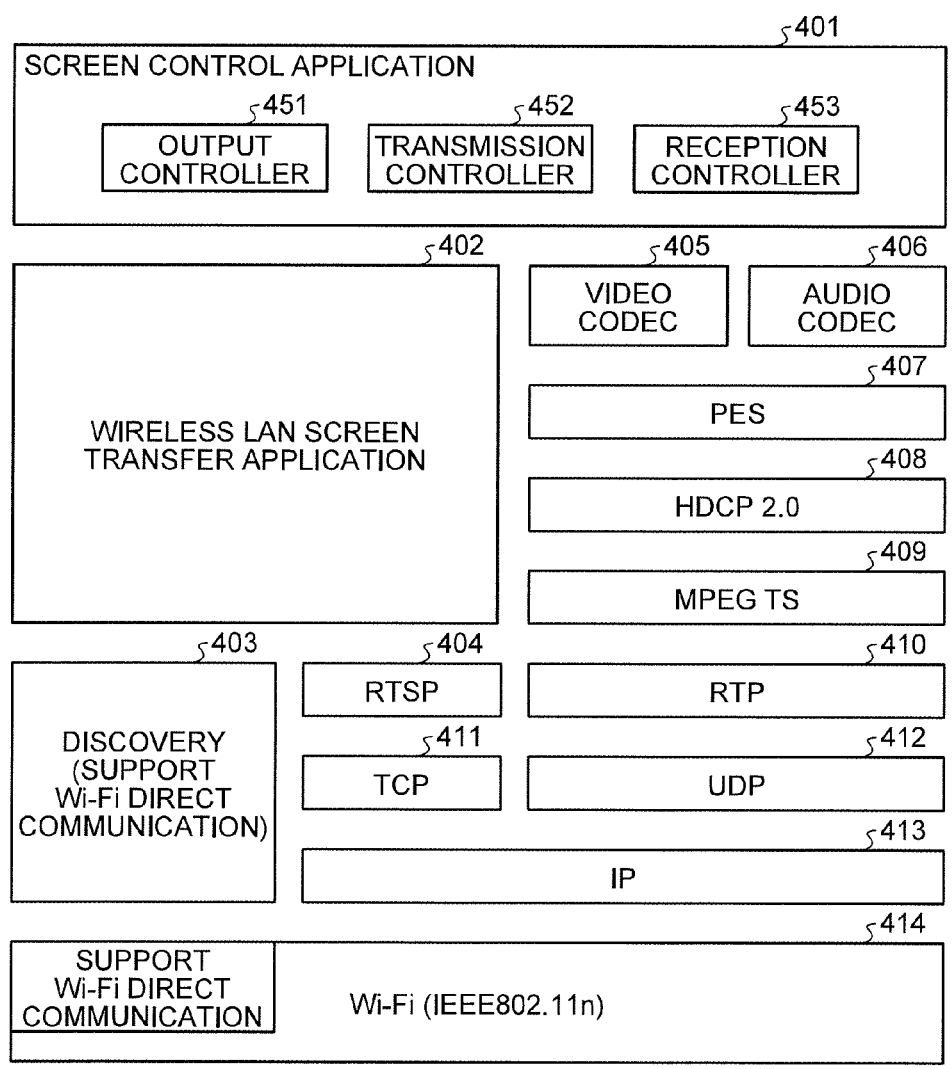
FIG. 4 is an exemplary diagram of a configuration of a communication protocol stack of the communication device in the first embodiment.

FIG. 4 illustrates a configuration of a communication protocol stack of the first communication device 100 according to the first embodiment. As illustrated in FIG. 4, the first communication device 100 comprises a screen control application 401 at an uppermost level. Furthermore, a software group for transferring video data with the wireless LAN is provided at a lower hierarchy of the screen control application 401 in a hierarchical form. It is to be noted that since the second communication device 150_1 to the fifth communication device 150_4 have the same configuration, description thereof is omitted.

As illustrated in FIG. 4, the first communication device 100 comprises a wireless LAN screen transfer application 402, a Discovery layer 403, a real time streaming protocol (RTSP) layer 404, a Video_Codec layer 405, an Audio_Codec layer 406, a PES layer 407, an HDCP_2.0 layer 408, an MPEG_TS layer 409, a real-time transport protocol (RTP) layer 410, a transmission control protocol (TCP) layer 411, a user datagram protocol (UDP) layer 412, an internet protocol (IP) layer 413, and a Wi-Fi (IEEE802.11n) layer 414 as the software group for transferring video data with the wireless LAN.

Each piece of software comprised in the software group as illustrated in FIG. 4 converts information input from a layer at an upper level to a format suitable to communication, and outputs it to a layer at a lower level. Furthermore, each piece of software converts information input from a layer at a lower level to a format suitable to a layer at an upper level, and outputs it to the layer at the upper level.

The Wi-Fi (IEEE802.11n) layer 414 is a layer for performing wireless communication and supports Wi-Fi direct communication. Furthermore, the Discovery layer 403 is a layer for detecting a communication device with which wireless communication can be performed and supports the Wi-Fi direct communication.

The RTSP layer 404 is a protocol for operating a communication device that is connected through wireless communication remotely. The RTSP layer 404 according to the first embodiment adds a function for performing screen transfer with the wireless LAN based on RFC2326.

The RTP layer 410 performs communication using a communication method standardized by RFC3550.

Each of the communication devices 100, and 150_1 to 150_4 according to the first embodiment uses the RTSP (TCP) as a control protocol of screen transfer and uses the RTP (UDP) as a video transmission protocol.

The wireless LAN screen transfer application 402 calls the Discovery layer 403 and the RTSP layer 404, and controls until transmission of video data is started between the first communication device 100 and another communication device. Furthermore, the wireless LAN screen transfer application 402 calls the RTSP layer 404 and controls for transmitting and receiving data (for example, transferring video data) to and from another communication device. Moreover, the wireless LAN screen transfer application 402 performs control of when transmission of video data is finished.

The screen control application 401 comprises an output controller 451, a transmission controller 452, and a reception controller 453. The screen control application 401 controls a screen to be displayed on the display 202 and controls for transmitting the screen to another communication device.

The output controller 451 controls to output video data (moving image data) indicating a screen generated based on an application that is executed by the first communication device 100 to the display 202. In the first embodiment, a case in which a transmission target is moving image data is described. However, the transmission target may be still image data.

The transmission controller 452 controls to transmit video data to a communication device connected through wireless communication using the software group at the lower layer of the screen control application 401. In the first embodiment, the transmission controller 452 calls the software group at the lower layer so as to control to transmit video data by unicast when there exists only one communication device as a transmission destination, and transmit video data by multicast when there exists more than one communication devices as the transmission destinations.

The unicast is a method of transmitting data while specifying a single transmission party on communication network. An IP address is used for specifying the transmission party.

The multicast is a method of transmitting packets (data) to specified plurality of communication devices on the communication network at the same time. When communication is performed on single point-to-multipoint, network load can be reduced in comparison with a case in which the unicast is used.

Furthermore, as another method of transmitting packets to a plurality of communication devices, there is also a broadcast. The broadcast is a method of transmitting packets (data) to a large unspecified number of apparatuses at the same time. The broadcast is not used in the first embodiment. However, video data may be transmitted by the broadcast depending on embodiments.

The reception controller 453 calls the software group at the lower layer of the screen control application 401 so as to control to receive information for transmitting video data from the communication device connected through the wireless communication. For example, the reception controller 453 controls to receive a transmission request of video data.

For example, when the reception controller 453 receives a transmission request of video data from the third communication device 150_2 while the first communication device 100 transmits video data to the second communication device 150_1 by unicast, the transmission controller 452 calls the wireless LAN screen transfer application 402 at the lower layer, so that transmission of the video data to the second communication device 150_1 by unicast stops. Thereafter, the transmission controller 452 calls the wireless LAN screen transfer application 402 so as to control for transmitting the video data to the second communication device 150_1 and the third communication device 150_2 by multicast.

Next, transmission procedures of video data through the wireless LAN according to the first embodiment are described. In the following drawings, the first communication device 100 is provided at the transmission side. Furthermore, the second communication device 150_1, the third communication device 150_2, the fourth communication device 150_3, and the fifth communication device 150_4 are provided at the reception sides.

Figure 5:
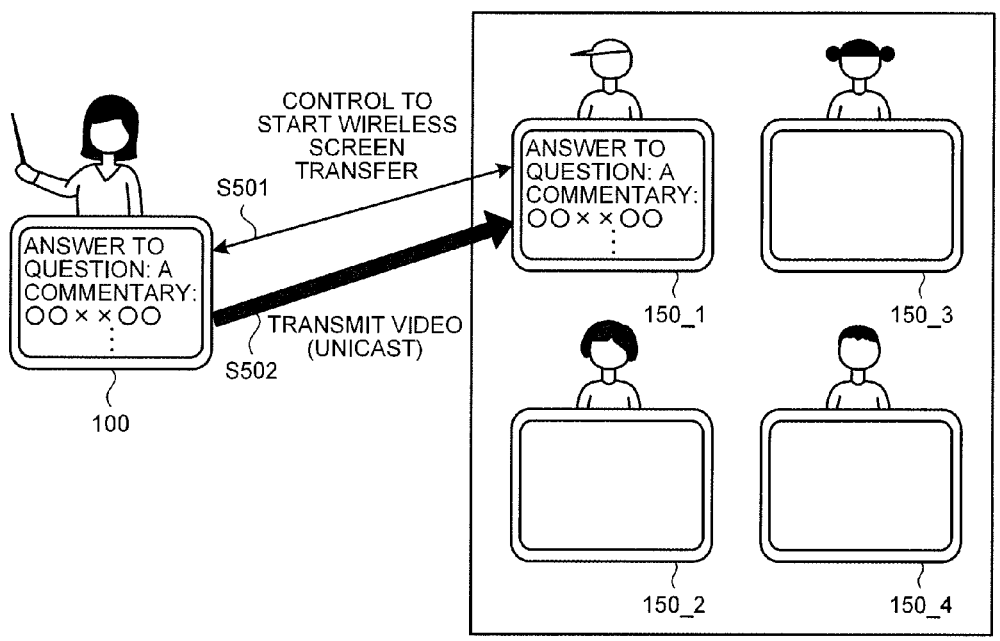
FIG. 5 is an exemplary diagram illustrating a concept until the communication device starts transmission of video data to a second communication device in the first embodiment.

FIG. 5 is a diagram illustrating a concept until the first communication device 100 starts transmission of video data to the second communication device 150_1 by unicast. In the example as illustrated in FIG. 5, the place of education is supposed and each of four students has a communication device (the second communication device 150_1 to the fifth communication device 150_4) that receives and displays a screen, and a teacher has a communication device (the first communication device 100) that provides the screen. Furthermore, an example in which the second communication device 150_1 that one of the four students has is connected to the first communication device 100 that the teacher has is described.

First, the second communication device 150_1 (screen reception side) and the first communication device 100 (screen provision side) control to start screen transfer with a wireless LAN (S501). In the first embodiment, the first communication device 100 performs Device Discovery processing so as to select any (in FIG. 5, the second communication device 1501) of the discovered communication devices. Then, the first communication device 100 establishes RTSP connection to the selected second communication device 150_1.

Thereafter, the first communication device 100 transfers video data indicative of a screen to the second communication device 150_1 by unicast through the wireless LAN (S502). With this configuration, the video data is transmitted from the first communication device 100 to the second communication device 150_1 by unicast.

Figure 6:
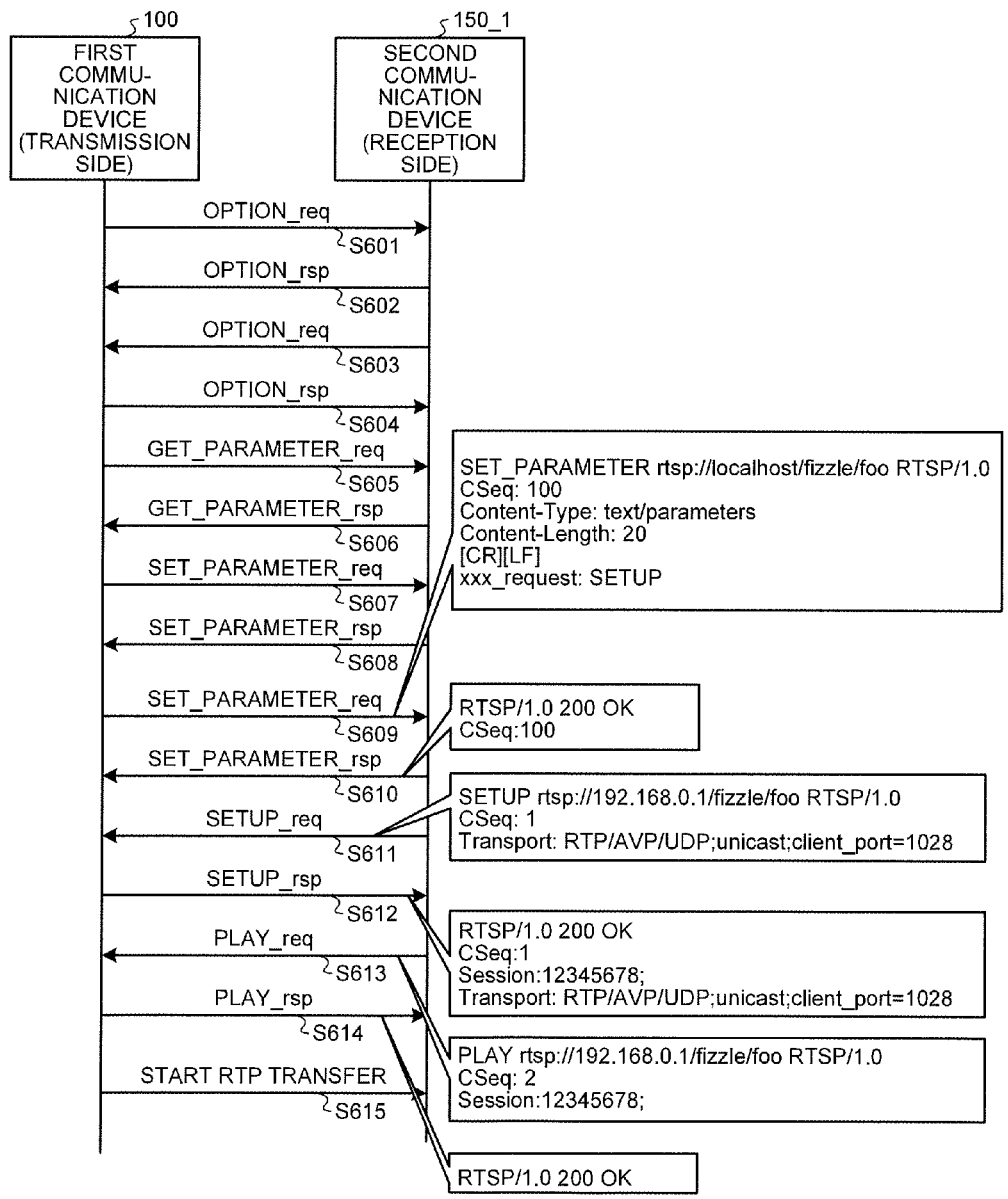
FIG. 6 is an exemplary diagram of a sequence until a first communication device and the second communication device start transmission of video data by unicast in the first embodiment.

FIG. 6 is a view illustrating a sequence until the first communication device 100 and the second communication device 150_1 establish the RTSP connection and start transmission of video data by unicast. Thus, in the example as illustrated in FIG. 6, the reception controller 453 of the first communication device 100 has already received a transfer request of video data indicative of a screen from the second communication device 150_1. Therefore, processing is performed using commands of the RTSP. It is to be noted that various types of commands of the RTSP are not described since they are already open.

First, the transmission controller 452 of the first communication device 100 calls the wireless LAN screen transfer application 402, and requests to connect to the second communication device 150_1.

With this configuration, the wireless LAN screen transfer application 402 of the first communication device 100 calls the RTSP layer 404 to transmit an "OPTION_req (option request)" to the second communication device 150_1 (S601). The request is a command for requesting options comprised by the second communication device 150_1.

When the second communication device 150_1 receives the "OPTION_req (option request)", the wireless LAN screen transfer application 402 of the second communication device 150_1 calls the RTSP layer 404, and transmits an "OPTION_rsp (option response)" as a response to the received request to the first communication device 100

(S602). Options comprised by the second communication device 150_1 are notified to the first communication device 100 with the response.

Then, the wireless LAN screen transfer application 402 of the second communication device 150_1 transmits an "OPTION_req" to the first communication device 100 (S603).

When the first communication device 100 receives the "OPTION_req", the wireless LAN screen transfer application 402 of the first communication device 100 transmits an "OPTION_rsp" as a response to the received request to the second communication device 150_1 (S604).

Next, the wireless LAN screen transfer application 402 of the first communication device 100 transmits a "GET_PARAMETER_req (get parameter request)" to the second communication device 150_1 (S605).

Then, the wireless LAN screen transfer application 402 of the second communication device 150_1 transmits a "GET_PARAMETER_rsp (get parameter response)" as a response to S605 to the first communication device 100 (S606).

Next, the wireless LAN screen transfer application 402 of the first communication device 100 transmits a "SET_PARAMETER_req (set parameter request)" to the second communication device 150_1 (S607).

Then, the wireless LAN screen transfer application 402 of the second communication device 150_1 transmits a "SET_PARAMETER_rsp (set parameter response)" as a response to S607 to the first communication device 100 (S608).

Next, the wireless LAN screen transfer application 402 of the first communication device 100 transmits a "SET_PARAMETER_req (set parameter request)" to the second communication device 150_1 (S609).

The request at S609 comprises an "xxx_request: SETUP". The "xxx_request: SETUP" is a parameter extended for the first embodiment and is a parameter for requesting the second communication device 150_1 to issue a setup command from the first communication device 100. That is to say, since transfer of video data by the first communication device 100 is triggered by the command issued by the second communication device 150_1, in the first embodiment, the first communication device 100 requests the second communication device 150_1 to issue the command after prepared.

Then, the wireless LAN screen transfer application 402 of the second communication device 150_1 transmits a "SET_PARAMETER_rsp (set parameter response)" as a response to S609 to the first communication device 100 (S610). In the example as illustrated in FIG. 6, "RTSP/1.0 200 OK" comprised in the "SET_PARAMETER_rsp" indicates that a setup command has been approved to be issued.

Next, the wireless LAN screen transfer application 402 of the second communication device 150_1 transmits a "SETUP_req (setup request)" to the first communication device 100 (S611). "Transport:RTP/AVP/UDP;unicast;client_port=1028" in the request comprises a protocol that is used for screen transfer, a fact that the unicast is employed, and a port number that is used for the screen transfer.

Then, the wireless LAN screen transfer application 402 of the first communication device 100 transmits a "SETUP_rsp (setup response)" to the second communication device 150_1 (S612). In the response, a session identifier "12345678", a fact that the unicast is employed, and the like are defined.

Next, the wireless LAN screen transfer application 402 of the second communication device 150_1 transmits a "PLAY_req (play request)" to the first communication device 100 (S613).

Then, the wireless LAN screen transfer application 402 of the first communication device 100 transmits a "PLAY_rsp (play response)" to the second communication device 150_1 (S614).

Thereafter, the first communication device 100 starts transmission of the video data by unicast using the RTP layer 410 (S615).

With the above-described processing procedures, the transmission of the video data to the second communication device 150_1 from the first communication device 100 by unicast is started.

A case in which a request for screen transfer has been received from another communication device after transmission of video data on one-to-one by unicast has been started is described.

Figure 7:
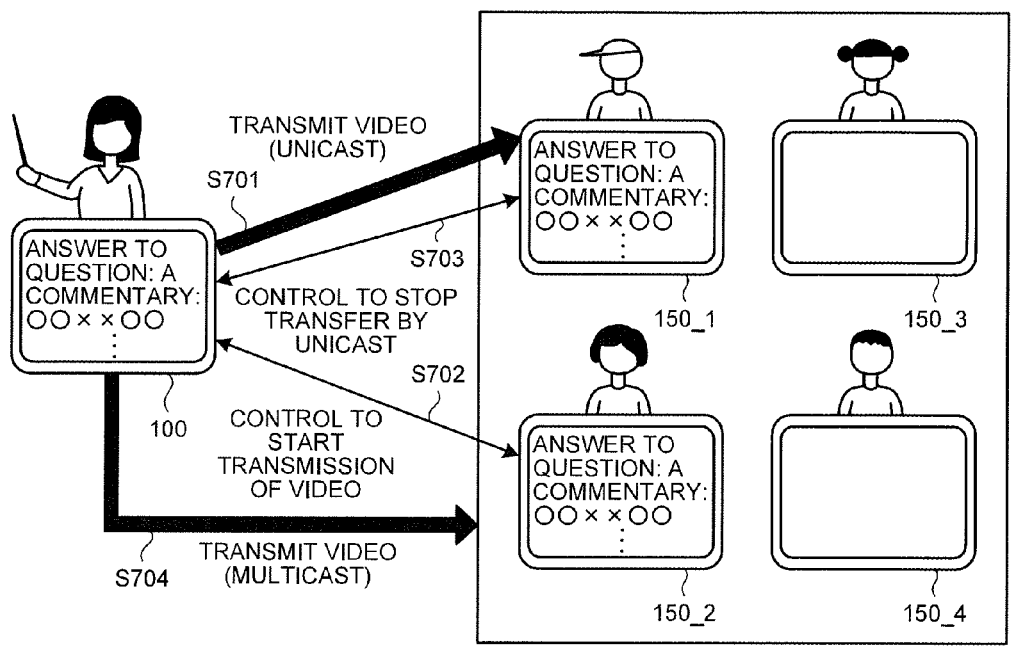
FIG. 7 is an exemplary diagram illustrating a concept until the first communication device starts transmission of video data to a plurality of communication devices by multicast in the first embodiment.

FIG. 7 is a diagram illustrating a concept until the first communication device 100 starts transmission of video data to a plurality of communication devices by multicast in accordance with a transfer start request from the third communication device 150_2.

As illustrated in FIG. 7, it is assumed that the first communication device 100 and the second communication device 150_1 has been performing wireless LAN screen transfer with Wi-Fi Direct of one-to-one connection (S701). In this state, another new communication device (for example, the third communication device 150_2) is connected to the first communication device 100 to request to control to start screen transfer with the wireless LAN and tries to display the same video as that on the second communication device 150_1 during operation (S702).

In this case, the first communication device 100 copes with that by switching from unicast to multicast. Therefore, the RTSP connection between the first communication device 100 and the second communication device 150_1 is not disconnected and control to PAUSE transmission of the video data by unicast is performed (S703). With this configuration, the transmission by unicast is stopped.

Then, preparation (SETUP) for RTP transfer is performed again. Therefore, a session identifier is changed to new one. The first communication device 100 is triggered by start (PLAY) of transfer of the RTSP connection so as to restart transfer of video data to multicast addresses comprising the second communication device 150_1 and the third communication device 150_2 (S704). With this configuration, transfer of the video data by multicast is started.

That is to say, if the first communication device 100 transmits video data to each of the plurality of communication devices by unicast, processing load of the first communication device 100 and load of network are increased. Then, in the first embodiment, when screen transfer is performed on one-to-n, the video data is transmitted by multicast.

Figure 8:
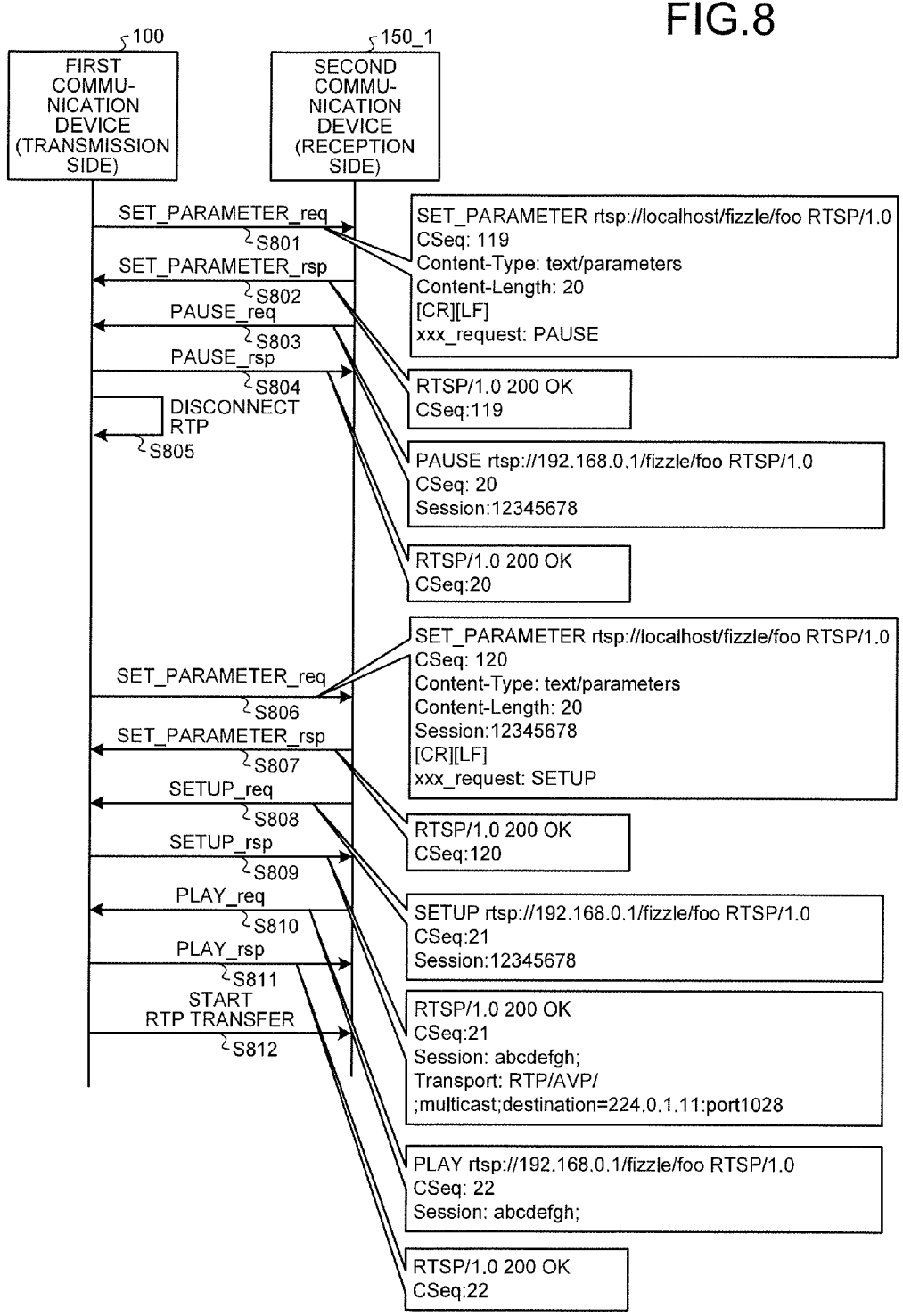
FIG. 8 is an exemplary diagram of a sequence until transmission of video data by multicast is started between the first communication device and the second communication device in the first embodiment.

FIG. 8 is a view illustrating a sequence until transmission of video data by multicast is started between the first communication device 100 and the second communication device 150_1. In the sequence as illustrated in FIG. 8, it is assumed that a transfer start request of video data has been received from the third communication device 150_2. Therefore, processing for PAUSE is started.

First, the wireless LAN screen transfer application 402 of the first communication device 100 transmits a "SET_PARAMETER_req" to the second communication device 150_1 (S801).

The request at 5801 comprises an "xxx_request: PAUSE". The "xxx_request: PAUSE" is a parameter extended for the first embodiment, and is a parameter for requesting the second communication device 150_1 to issue a command to pause from the first communication device 100. That is to say, since screen transfer by the first communication device 100 is triggered by the command issued from the second communication device 150_1, the first communication device 100 requests the second communication device 150_1 to issue the command to pause.

Then, the wireless LAN screen transfer application 402 of the second communication device 150_1 transmits a "SET_PARAMETER_rsp" as a response to S801 to the first communication device 100 (S802).

Next, the wireless LAN screen transfer application 402 of the second communication device 150_1 transmits a "PAUSE_req (pause request)" to the first communication device 100 (S803). The request comprises a session identifier "12345678" as a target of the pause.

Then, the wireless LAN screen transfer application 402 of the first communication device 100 transmits a "PAUSE_rsp (pause response)" to the second communication device 150_1 as a response to S803 (S804).

Then, the first communication device 100 disconnects the transmission of video data (session identifier "12345678") by RTP (S805).

Next, the wireless LAN screen transfer application 402 of the first communication device 100 transmits a "SET_PARAMETER_req (set parameter request)" to the second communication device 150_1 (S806). The request at S806 comprises the "xxx_request: SETUP" as in the sequence as illustrated in FIG. 6.

Then, the wireless LAN screen transfer application 402 of the second communication device 150_1 transmits a "SET_PARAMETER_rsp (set parameter response)" as a response to S806 to the first communication device 100 (S807).

Next, the wireless LAN screen transfer application 402 of the second communication device 150_1 transmits the "SETUP_req (setup request)" to the first communication device 100 (S808).

Then, the wireless LAN screen transfer application 402 of the first communication device 100 transmits a "SETUP_rsp (setup response)" to the second communication device 150_1 (S809). In the response, a session identifier "abcdefgh", a fact that the multicast is employed for communication, a multicast address "224.0.1.11", and the like are defined. Subsequently, the second communication device 150_1 performs setting such that the multicast address "224.0.1.11" comprises the apparatus itself.

Next, the wireless LAN screen transfer application 402 of the second communication device 150_1 transmits a "PLAY_req (play request)" to the first communication device 100 (S810). Also in the response, a session identifier "abcdefgh", a fact that the multicast is employed for communication, and the like are defined.

Then, the wireless LAN screen transfer application 402 of the first communication device 100 transmits a "PLAY_rsp (play response)" to the second communication device 150_1 (S811).

Thereafter, the first communication device 100 starts transmission of video data to a multicast address by multicast using the RTP layer 410 (S812).

Figure 9:
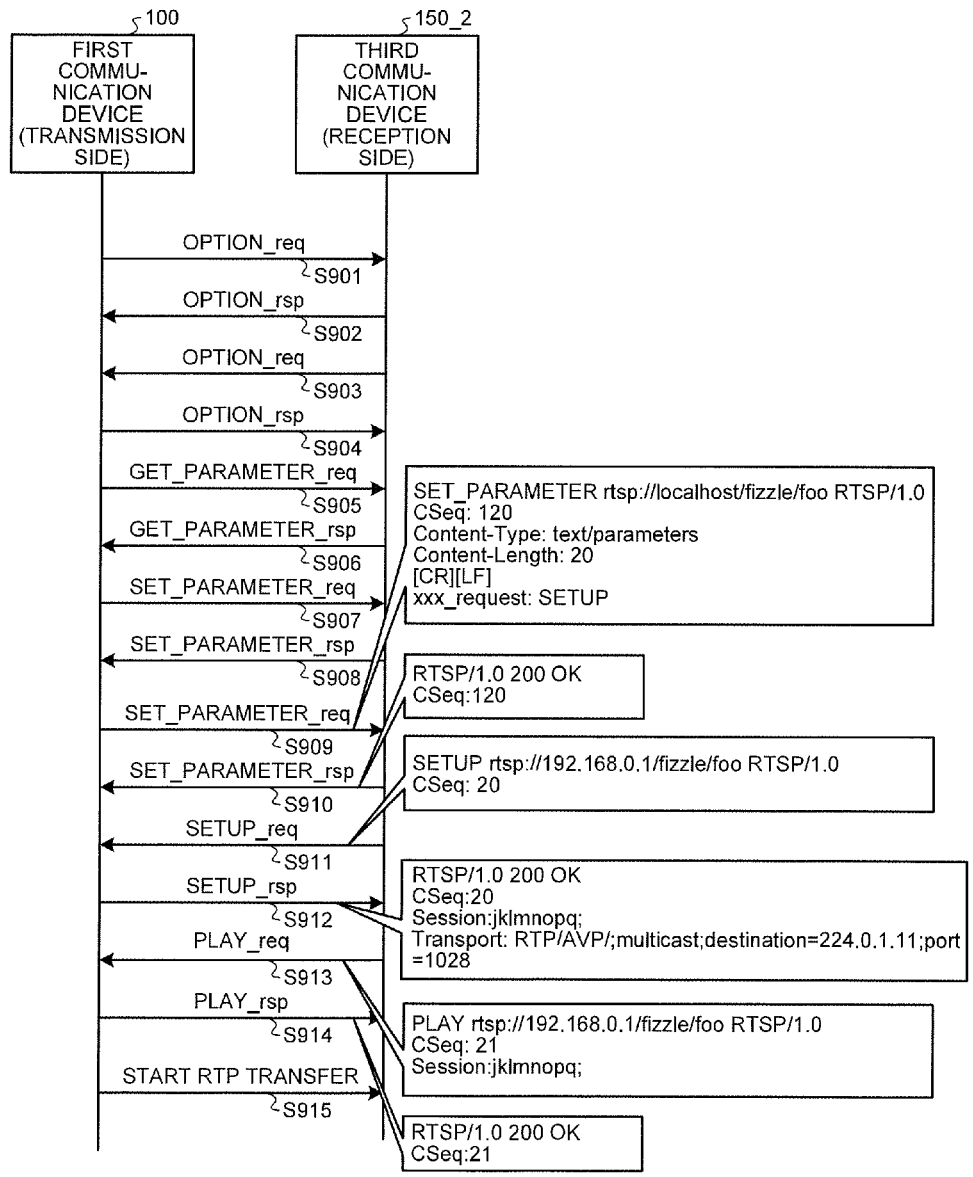
FIG. 9 is an exemplary diagram of a sequence until transmission of video data by multicast is started between the first communication device and a third communication device in the first embodiment.

FIG. 9 is a view illustrating a sequence until transmission of video data by multicast is started between the first communication device 100 and the third communication device 150_2. In the sequence until the video data is transmitted by multicast as illustrated in FIG. 9, substantially the same processing as that in the sequence until the video data is transmitted by unicast as illustrated in FIG. 6 is performed.

Then, among the processing as illustrated in FIG. 9, a point that is different from the case in which unicast is employed in FIG. 6 is described. At S911, the wireless LAN screen transfer application 402 of the third communication device 150_2 transmits a "SETUP_req (setup request)" to the first communication device 100. In this case, unicast is specified as a transmission method at S611. However, the transmission method is not specified at S911. This is because the first communication device 100 has notified the third communication device 150_2 of a fact that transfer has been performed between the first communication device 100 and the second communication device 150_1 previously.

Then, the wireless LAN screen transfer application 402 of the first communication device 100 transmits a "SETUP_rsp (setup response)" to the third communication device 150_2 (S912). In the response, a session identifier "jklmnopq", a fact that the multicast is employed, the multicast address "224.0.1.11", and the like are defined. Subsequently, the third communication device 150_2 performs setting such that the multicast address "224.0.1.11" comprises the apparatus itself.

Thereafter, the wireless LAN screen transfer application 402 of the third communication device 150_2 transmits a "PLAY_req (play request)" to the first communication device 100 (S913). In this case, specification whether a communication method is multicast or unicast is not performed. Furthermore, the session identifier "jklmnopq" is set.

Then, the wireless LAN screen transfer application 402 of the first communication device 100 transmits a "PLAY_rsp (play response)" to the third communication device 150_2 (S914).

Thereafter, the first communication device 100 starts transmission of video data to a multicast address by multicast by using the RTP layer 410 (S915).

With the above-described sequence, transmission of the video data is started from the first communication device 100 to the second communication device 150_1 and the third communication device 150_2 by multicast.

Figure 10:
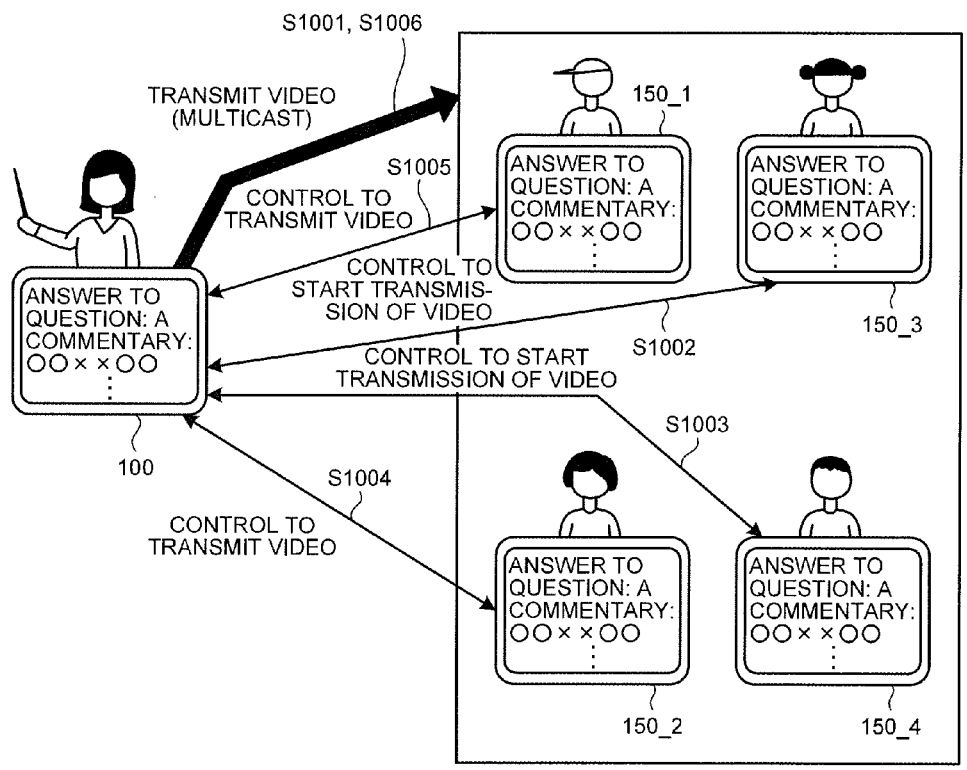
FIG. 10 is an exemplary diagram illustrating a concept until the first communication device starts transmission of video data to a fourth communication device and a fifth communication device by multicast in the first embodiment.

FIG. 10 is a diagram illustrating a concept until the first communication device 100 starts transmission of video data to the fourth communication device 150_3 and the fifth communication device 150_4 by multicast in accordance with a transfer start request.

In an example as illustrated in FIG. 10, video data indicative of the screen has already been transmitted between the first communication device 100 and the second communication device 150_1 and the third communication device 150_2 through the wireless LAN with Wi-Fi Direct of on-to-two connection (S1001). In this case, other two new communication devices (the fourth communication device 150_3, the fifth communication device 150_4) are connected to the first communication device 100 to request to control to start transmission of a video with the wireless LAN and try to display the same video as that on the second communication device 150_1 and the third communication device 150_2 during operation (S1002, S1003).

Since the video data has already been transmitted by multicast, the fourth communication device 150_3 and the fifth communication device 150_4 establish the RTSP connection to the first communication device 100 and perform setting for transmitting the video data by using the RTP. For example, the fourth communication device 150_3 and the fifth communication device 150_4 set multicast addresses, and so on.

In addition, the second communication device 150_1 and the third communication device 150_2 control transmission of the video data through the wireless LAN between the second communication device 150_1 and the third communication device 150_2 and the first communication device 100 if needed (S1004, S1005).

With this configuration, the first communication device 100 transmits the video data to the second communication device 150_1, the third communication device 150_2, the fourth communication device 150_3, and the fifth communication device 150_4 by multicast (S1006).

Figure 11:
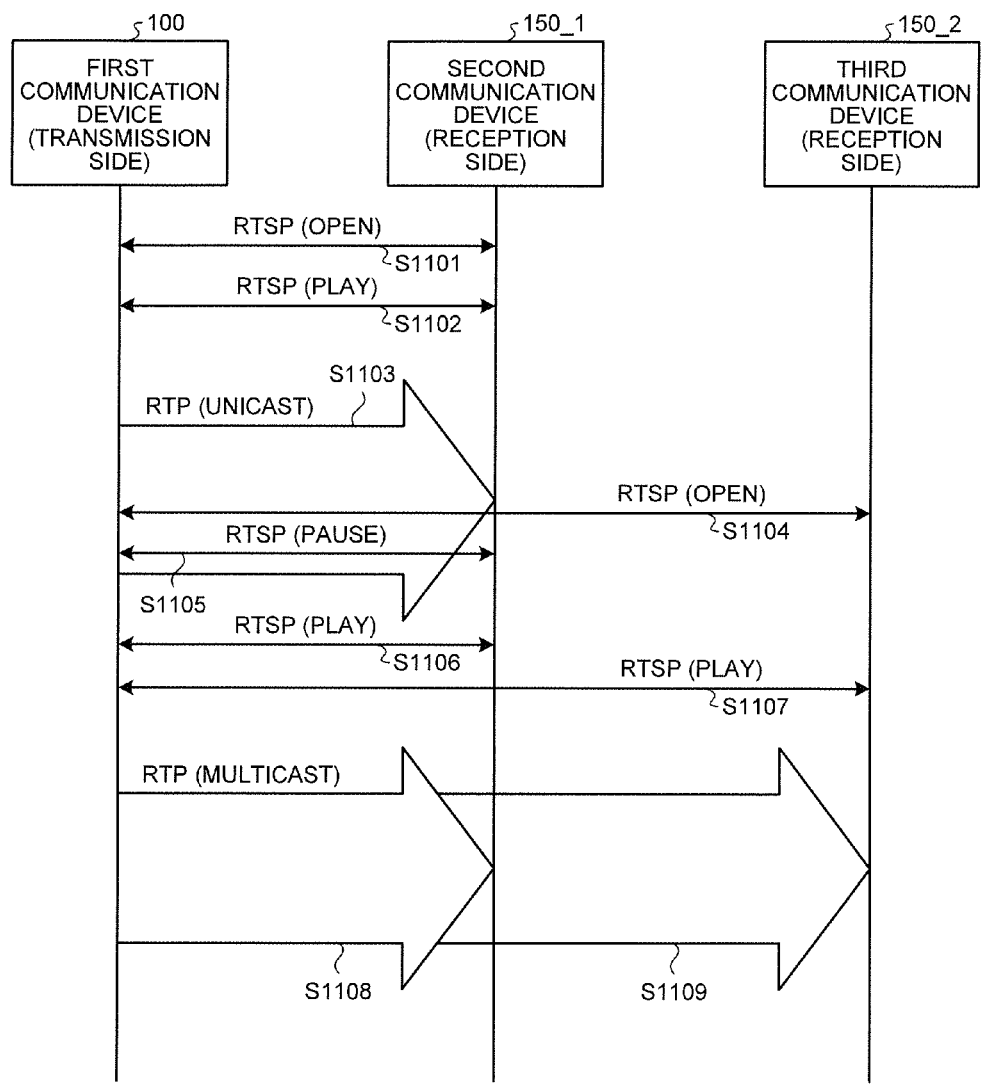
FIG. 11 is an exemplary diagram of a sequence when the number of transmission destinations of video data by the first communication device is increased in the first embodiment.

FIG. 11 is a view illustrating a sequence when the number of transmission destinations of video data by the first communication device 100 is increased.

First, the first communication device 100 and the second communication device 150_1 perform setup for starting a session of RTSP (S1101). It is to be noted that "OPEN" as illustrated in FIG. 11 indicates OPTION method processing, GET_PARAMETER method processing, SET_PARAMETER method processing, and the like collectively.

Next, the first communication device 100 and the second communication device 150_1 establish the session of the RTSP, and then, control to start PLAY of transferring video data (S1102).

Then, the first communication device 100 transmits video data to the second communication device 150_1 by unicast by using the RTP (S1103).

Thereafter, setup for starting the session of the RTSP is performed between the first communication device 100 and the third communication device 150_2 (S1104).

With this configuration, control to PAUSE the transmission of the video data is performed between the first communication device 100 and the second communication device 150_1 (S1105).

Next, the first communication device 100 and the second communication device 150_1 establish a session for transmission by multicast, and then, control to start PLAY of transmitting the video data (S1106).

Furthermore, the first communication device 100 and the third communication device 150_2 also establish a session for transmission by multicast, and then, control to start PLAY of transmitting the video data (S1107).

With this configuration, the first communication device 100 transmits the video data to the second communication device 150_1 and the third communication device 150_2 by multicast by using the RTP (S1108, S1109).

Figure 12:
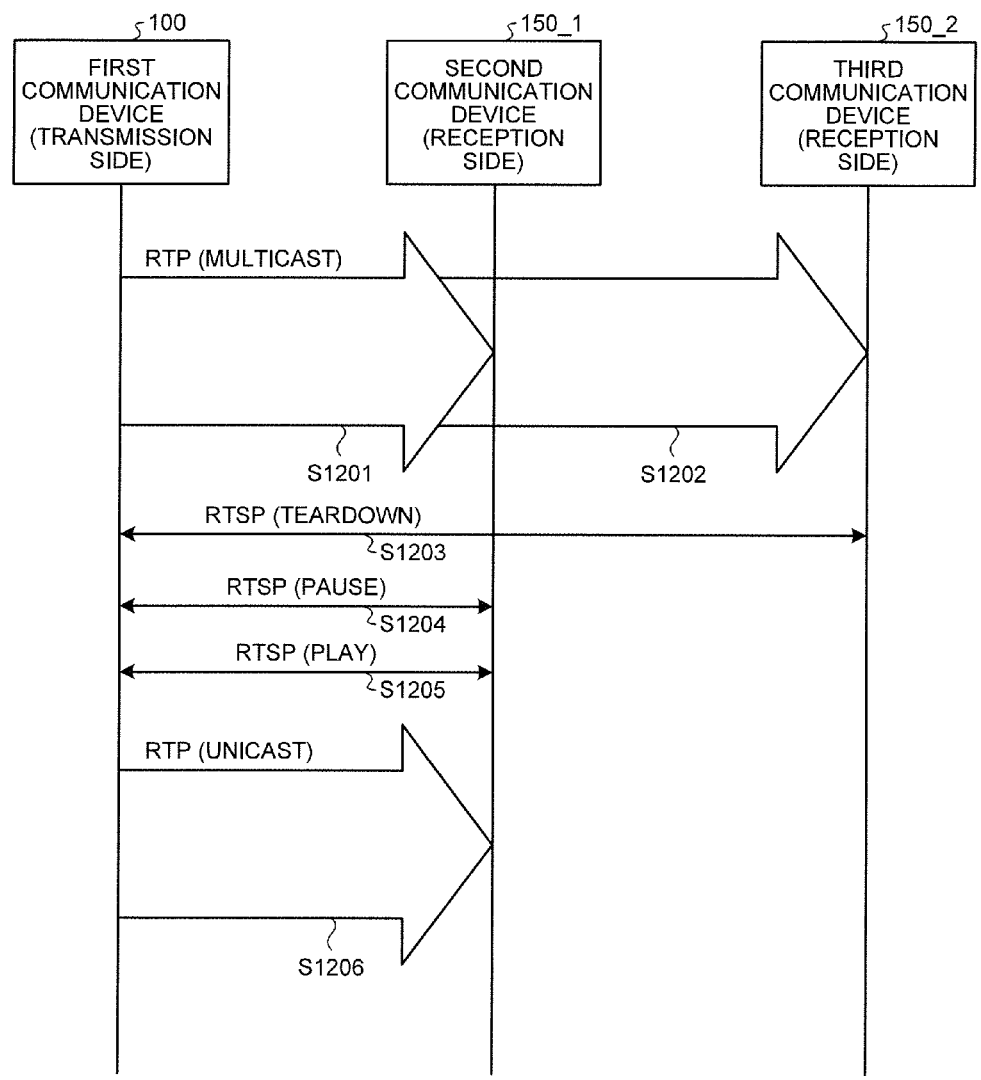
FIG. 12 is an exemplary diagram of a sequence when the number of transmission destinations of video data by the first communication device is decreased in the first embodiment.

FIG. 12 is a view illustrating a sequence when the number of transmission destinations of video data by the first communication device 100 is decreased in accordance with a transfer stop request.

First, the first communication device 100 transmits video data to the second communication device 150_1 and the third communication device 150_2 by multicast by using the RTP (S1201, S1202).

Next, the third communication device 1502 controls to stop transmission by a TEARDOWN command of the RTSP for requesting to stop the transmission (S1203).

Then, control to PAUSE the transmission of the video data is performed between the first communication device 100 and the second communication device 150_1 (S1204).

Next, the first communication device 100 and the second communication device 150_1 establish a session for transmission by unicast, and then, control to start PLAY of transmitting the video data (S1205).

Thereafter, the first communication device 100 transmits the video data to the second communication device 150_1 by unicast (S1206).

With the above-described processing procedures, when a transmission target becomes one, multicast is switched to unicast. This makes it possible to suppress consumption of network resource.

Conventionally, video data indicating a screen is transferred with the wireless LAN as follows. That is, the communication device at the transmission side and the communication device at the reception side are connected to each other on one-to-one and the video data is transmitted by unicast. Therefore, it has not been considered that the video data is transmitted to two communication devices. If two communication devices are connected to the communication device at the transmission side, different RTSP connections are required to be established, and video data is required to be transmitted to each of the two communication devices by unicast. However, since processing capacity of the communication device at the transmission side and the throughput of the wireless LAN are limited, it has been difficult to transmit the video data to two communication devices under these circumstances.

On the other hand, in the above-described embodiment, when connection requests are issued from a plurality of communication devices, transfer methods of video data with RTP are switched from unicast to multicast. If the multicast is employed, processing load of the communication device at the transmission side and the throughput of the wireless LAN can be reduced in comparison with a case in which the video data is transmitted to each of the plurality of communication devices by unicast. With this configuration, video data can be transmitted to several dozens of communication devices in theory.

In the first embodiment, a case in which video data is transmitted by unicast when there exists one transmission target has been described. However, the embodiment is not limited to the case in which video data is transmitted by unicast when there exists one transmission target. In the second embodiment, a case in which video data is transmitted by multicast even when there exists only one transmission target is described.

It is to be noted that configurations of the first communication device 100 to fifth communication device 150_4 are the same as those in the first embodiment and description thereof is omitted.

Figure 13:
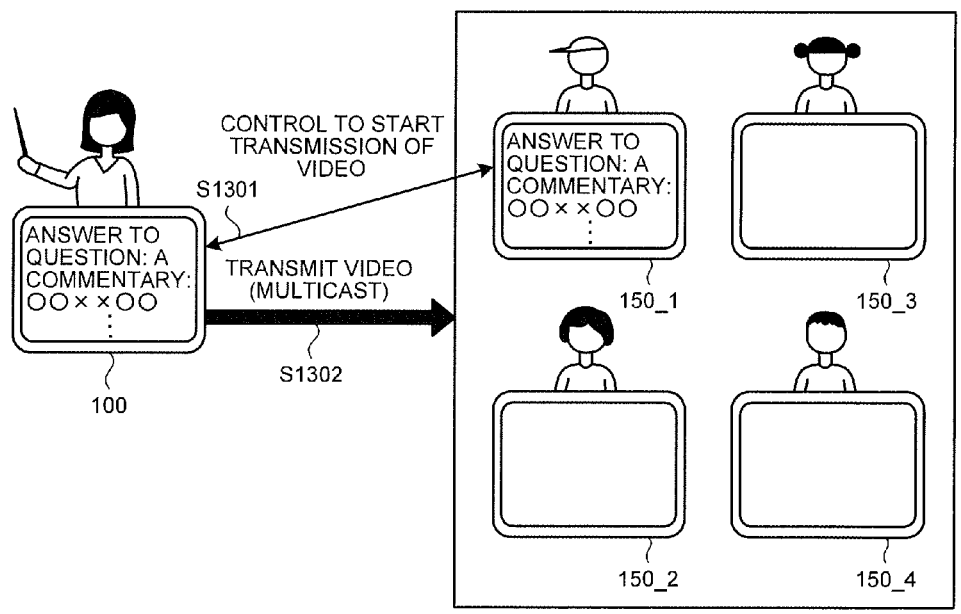
FIG. 13 is an exemplary diagram illustrating a concept until a first communication device starts transmission of video data to a second communication device by multicast according to a second embodiment.

FIG. 13 is a view illustrating a concept until the first communication device 100 starts transmission of video data to the second communication device 150_1 by multicast.

The second communication device 150_1 (screen reception side) and the first communication device 100 (screen provision side) control to start screen transfer with a wireless LAN (S1301). In the second embodiment, the first communication device 100 performs Device Discovery processing so as to select any (in FIG. 13, second communication device 150_1) of the discovered communication devices. Then, the first communication device 100 establishes RTSP connection to the selected second communication device 150_1.

Thereafter, the first communication device 100 transmits video data indicating a screen to the second communication device 150_1 by multicast through the wireless LAN (S1302). With this configuration, the video data is transmitted from the first communication device 100 to the second communication device 150_1 by multicast.

Figure 14:
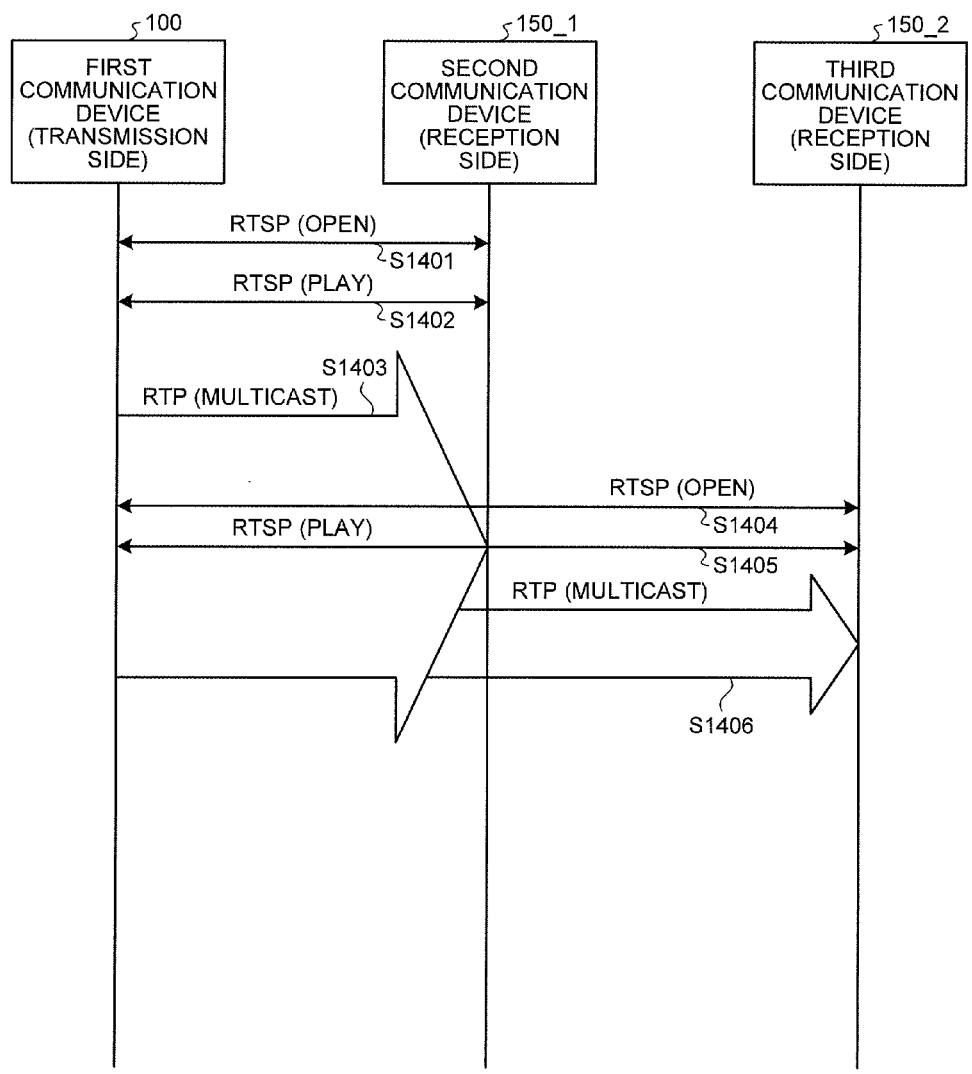
FIG. 14 is an exemplary diagram of a sequence when the number of transmission destinations of video data by the first communication device is increased in the second embodiment.

FIG. 14 is a view illustrating a sequence when the number of transmission destinations of video data by the first communication device 100 is increased.

First, the first communication device 100 and the second communication device 150_1 perform setup for starting a session of RTSP (S1401).

Next, the first communication device 100 and the second communication device 150_1 establish the session of the RTSP, and then, control to start PLAY of transferring video data (S1402).

Then, the first communication device 100 transmits the video data to the second communication device 150_1 by multicast by using the RTP (S1403).

Thereafter, setup for starting the session of the RTSP is performed between the first communication device 100 and the third communication device 150_2 (S1404).

In the first embodiment, control to PAUSE the transmission of the video data is performed for switching from unicast to multicast. However, in the second embodiment, the transmission is not paused because the video data is transmitted by multicast from the case where the transmission destination is one.

Then, the first communication device 100 and the third communication device 150_2 establish a session for transmission by multicast, and then, control to start PLAY of transmitting the video data (S1405).

With this configuration, the first communication device 100 transmits the video data to the third communication device 150_2 by multicast by using the RTP (S1406).

In the second embodiment, the video data is transmitted by multicast from the case where the transmission destination is one. Therefore, other communication devices can display the video data only by issuing transfer requests of the video data by multicast and setting multicast addresses.

Furthermore, when the number of the transmission destinations is increased from one to two, the transmission of the video data by using the RTP is not stopped. Therefore, the communication device that is connected from the beginning can be prevented from being adversely influenced.

In the second embodiment, a sequence until RTSP connection to the first communication device 100 is established and transfer of the video data by multicast by using the RTP is started is the same as the sequence as illustrated in FIG. 9. Therefore, description thereof is omitted.

In the second embodiment, the first communication device 100 transfers video data by multicast from the case where there exists one transmission destination. Therefore, even if the number of communication device is increased from one to two, the RTP transfer is not stopped. Therefore, when the number of communication devices as transfer destinations is increased, the communication devices to which video data is transferred from the beginning can be suppressed from being adversely influenced.

In the above-described embodiments, a case in which video data is transmitted by wireless communication has been described. However, the embodiment is not limited to the case in which the wireless communication is performed and video data may be transmitted with wired communication. In this case, a method of switching between unicast and multicast to be performed is the same as that in the above-described embodiments. Therefore, description thereof is omitted.

The communication control program to be executed on the communication device in the embodiments may be configured to be provided by being recorded in a computer-readable recording medium, such as a compact disc-read-only memory (CD-ROM), a flexible disk (FD), a CD recordable (CD-R), or a digital versatile disk (DVD), in a format that can be installed or a format that can be executed.

Furthermore, the communication control program to be executed on the communication device in the embodiments may be configured to be provided by being stored on a computer connected to network such as the Internet and being downloaded through the network. Alternatively, the communication control program to be executed on the communication device in the embodiments may be configured to be provided or distributed through network such as the Internet.

In addition, the communication control program in the embodiments may be configured to be provided by being incorporated in a ROM or the like previously.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication controller comprising:
an output module configured to control output of image information to a display;
a transmitter configured to transmit the image information to a first communication device by unicast; and
a receiver configured to receive a transmission request of the image information from a second communication device, wherein,
if the receiver receives the transmission request from the second communication device, the transmitter transmits a pause request for requesting the first communication device to issue a pause command,
if the receiver receives the pause command issued by the first communication device in response to the pause request, the transmitter stops transmission of the image information to the first communication device by unicast, and notifies the first communication device and the second communication device of a single multicast address, and
if the receiver receives a play request issued by at least either the first communication device or the second communication device, the transmitter transmits the image information to the multicast address so that the image information is transmitted to the first communication device and the second communication device by multicast.

2. The communication controller of claim 1, wherein,
after the transmitter transmits the image information to the first communication device and the second communication device by multicast, the receiver receives a stop request of the image information from the first communication device or the second communication device, and,
if the receiver receives the stop request from the first communication device or the second communication device, the transmitter stops the transmission of the image information by multicast, and transmits the image information to the first communication device or the second communication device that has not transmitted the stop request by unicast.

3. The communication controller of claim 1, wherein
the transmitter is configured to be capable of transmitting the image information to one communication device by multicast, and
if the receiver receives the transmission request from the second communication device while the transmitter has been transmitting the image information only to the first communication device by multicast, the transmitter does not stop the transmission of the image information to the first communication device, and transmits the image information to the first communication device and the second communication device by multicast.

4. The communication controller of claim 1, wherein the transmitter transmits the image information to at least one of the first communication device and the second communication device wirelessly without any other communication relay device, and the receiver receives the transmission request from the second communication device wirelessly without any other communication relay device.

5. The communication controller of claim 1, wherein the transmitter transmits the image information by using a real-time transport protocol.

6. The communication controller of claim 1, wherein the transmitter starts a first session identified by a first identifier to transmit the image information to the first communication device by unicast, stops the first session to stop the transmission of the image information by unicast, starts a second session identified by a second identifier different from the first identifier to transmit the image information to the first communication device by multicast using the multicast address, and starts a third session identified by a third identifier different from the first identifier to transmit the image information to the second communication device by multicast using the multicast address.

7. The communication controller of claim 1, wherein if the receiver receives the transmission request from the second communication device, the transmitter stops the transmission of the image information to the first communication device by unicast while keeping real time streaming protocol connection to the first communication device.

8. The communication controller of claim 1, wherein if the receiver receives the transmission request of the image information from a third communication device when the transmitter transmits the image information to the multicast address, the transmitter notifies the third communication device of the multicast address and transmits the image information to the multicast address so that the image information is transmitted to the third communication device.

9. The communication controller of claim 1, wherein the receiver receives the pause command using a session already used for the transmission of the image information by unicast between the communication controller and the first communication device.

10. A communication control method executed by a communication controller, the communication control method comprising:

controlling, by an output module, output of image information to a display;

transmitting, by a transmitter, the image information to a first communication device by unicast;

receiving, by a receiver, a transmission request of the image information from a second communication device;

if the receiver receives the transmission request from the second communication device, transmitting, by the transmitter, a pause request for requesting the first communication device to issue a pause command;

if the receiver receives the pause command issued by the first communication device in response to the pause request, stopping, by the transmitter, transmission of the image information to the first communication device by unicast, and notifying, by the transmitter, the first communication device and the second communication device of a single multicast address, if the receiver receives a play request issued by at least either the first communication device or the second communication device, the transmitter transmits the image information to the multicast address so that the image information is transmitted to the first communication device and the second communication device by multicast.

* * * * *